United States Patent
Jundt et al.

(10) Patent No.: US 11,037,380 B2
(45) Date of Patent: Jun. 15, 2021

(54) METHOD AND DEVICE FOR ASCERTAINING AN ORIENTATION OF A SENSOR UNIT

(71) Applicant: KNORR-BREMSE SYSTEME FUER NUTZFAHRZEUGE GMBH, Munich (DE)

(72) Inventors: Oliver Jundt, Hessigheim (DE); Michael Herges, Munich (DE); Falk Hecker, Markgroeningen (DE); Martin Vorreiter, Vaihingen (DE)

(73) Assignee: KNORR-BREMSE SYSTEME FUER NUTZFAHRZEUGE GMBH, Munich (DE)

(*) Notice: Subject to any disclaimer, the term of this patent is extended or adjusted under 35 U.S.C. 154(b) by 56 days.

(21) Appl. No.: 15/758,940

(22) PCT Filed: Sep. 6, 2016

(86) PCT No.: PCT/EP2016/070900
§ 371 (c)(1),
(2) Date: Mar. 9, 2018

(87) PCT Pub. No.: WO2017/042138
PCT Pub. Date: Mar. 16, 2017

(65) Prior Publication Data
US 2019/0043277 A1 Feb. 7, 2019

(30) Foreign Application Priority Data
Sep. 10, 2015 (DE) .................... 10 2015 115 282.7

(51) Int. Cl.
*G07C 5/08* (2006.01)
*B60T 8/1755* (2006.01)
(Continued)

(52) U.S. Cl.
CPC ............ *G07C 5/0808* (2013.01); *B60T 8/172* (2013.01); *B60T 8/17551* (2013.01); *B60T 8/885* (2013.01);
(Continued)

(58) Field of Classification Search
CPC ............... G07C 5/0808; B60T 8/17551; B60T 2270/30; B60T 2250/06; B60T 2270/413; B60T 8/172; B60T 8/885
See application file for complete search history.

(56) References Cited

U.S. PATENT DOCUMENTS 6,308,134 B1  10/2001  Croyle et al.
6,532,419 B1   3/2003  Begin et al.
(Continued)

FOREIGN PATENT DOCUMENTS

CN   101223417 A   7/2008
CN   201298044 Y   8/2009
(Continued)

OTHER PUBLICATIONS

International Search Report dated Nov. 18, 2016, of the corresponding International Application PCT/EP2016/070900 filed Sep. 6, 2016.

*Primary Examiner* — Navid Ziaeianmehdizadeh
(74) *Attorney, Agent, or Firm* — Norton Rose Fulbright US LLP; Gerard Messina (57) ABSTRACT

A method and related apparatus for determining an orientation of a sensor unit in a vehicle, the sensor unit having at least one acceleration sensor, including: capturing a first sensor signal from the acceleration sensor in an acceleration-free state of the vehicle; capturing a second sensor signal from the acceleration sensor in response to a linear acceleration of the vehicle; and ascertaining the orientation of the
(Continued)

sensor unit relative to the vehicle based on the first sensor signal and the second sensor signal.

11 Claims, 10 Drawing Sheets

(51) Int. Cl.
  *B60T 8/88* (2006.01)
  *B60T 8/172* (2006.01)

(52) U.S. Cl.
  CPC ....... *B60T 2250/06* (2013.01); *B60T 2270/30* (2013.01); *B60T 2270/413* (2013.01)

(56) References Cited

U.S. PATENT DOCUMENTS

| | | | |
|---|---|---|---|
| 2001/0016791 | A1 | 8/2001 | Bolzmann et al. |
| 2006/0142920 | A1* | 6/2006 | Hashiba ................. B60T 8/368 701/70 |
| 2011/0313650 | A1 | 12/2011 | Tome |

FOREIGN PATENT DOCUMENTS

| | | |
|---|---|---|
| CN | 103303303 A | 9/2013 |
| CN | 104011548 A | 8/2014 |
| DE | 10260848 A1 | 7/2004 |
| DE | 102005059229 A1 | 7/2006 |
| DE | 102005033237 A1 | 1/2007 |
| DE | 102011113196 A1 | 3/2013 |
| DE | 102011121822 A1 | 6/2013 |
| EP | 1118519 A2 | 7/2001 |
| WO | 00/17607 A1 | 3/2000 |

\* cited by examiner

METHOD AND DEVICE FOR ASCERTAINING AN ORIENTATION OF A SENSOR UNIT

FIELD OF THE INVENTION

The present invention relates to a method and an apparatus for determining an orientation of a sensor unit and, in particular, to a method and an apparatus for quickly identifying installation directions of ESP units.

BACKGROUND INFORMATION

ESP units (ESP=electronic stability program) are driver assistance systems which determine abnormal spatial orientations of the vehicle and, on the basis thereof, prompt appropriate reactive responses. In order to satisfy their function, ESP units typically have at least one yaw rate sensor and one transverse acceleration sensor. These sensors form a sensor unit. In the case of currently conventional ESP units, this sensor unit must be installed in the vehicle with a specific directional orientation. Only then can it work as intended and it is possible to distinguish possible abnormal transverse accelerations from normal vehicle longitudinal accelerations or braking procedures in an unambiguous manner.

On account of the importance of the ESP, it is therefore necessary to check the installation thereof in order thus to reliably ensure that the ESP was inserted as intended and not inadvertently inserted the wrong way round.

A method is applied in current systems for the purposes of checking the orientation of the sensor unit, said method requiring at least one cornering maneuver in order thus to calculate yaw speeds of the vehicle from a plurality of sensor signals independently of one another. Here, a check is carried out as to whether the yaw rates, which are calculated from different input values, correspond within certain tolerances and, in particular, correspond in terms of their sign. Such a method is described in the document EP 1 118 519, wherein, according to the described method, the vehicle carries out at least one cornering maneuver in order to carry out the measurement. Firstly, this procedure is complicated since a corresponding test track with a sufficient curve must be present. Moreover, it harbors the risk that, in the case of incidents, an ESP intervention may already be necessary during the first cornering maneuver, even though the ESP has not yet been checked. Finally, a possibly necessary error warning on account of the possible incorrect spatial orientation of the installation can only be effectuated during or after the first cornering maneuver, distracting the driver from his driving action. In order to avoid this, there is a need for alternative options for reliably checking the installation of an ESP unit in a vehicle.

SUMMARY OF THE INVENTION

The present invention is based on the object of providing a method and an apparatus for determining an orientation of a sensor unit, said method and apparatus not having the aforementioned disadvantages and, in particular, facilitating a low-risk check of the orientation.

This object may be achieved by a method as described herein and by an apparatus as described herein. The further descriptions herein relate to further advantageous configurations of the subject matter of the main descriptions herein.

In particular, the present invention relates to a first method for determining an orientation of a sensor unit, wherein the sensor unit has at least one acceleration sensor and said sensor unit is installed in a vehicle. The first method includes the steps of: capturing a first sensor signal from the acceleration sensor in an acceleration-free state (e.g. a standstill or a rest state) of the vehicle; capturing a second sensor signal from the acceleration sensor in response to a linear acceleration of the vehicle; and ascertaining the orientation of the sensor unit relative to the vehicle on the basis of the first sensor signal and the second sensor signal.

The stated sequence of the steps (and also the further steps) does not imply a temporal sequence, or only implies this to the extent that is absolutely necessary. By way of example, the first sensor signal can be captured first and the capture of the second sensor signal (i.e. the acceleration) is effectuated thereafter. However, there may initially also be acceleration and capture of the second sensor signal, with the first sensor signal being captured subsequently.

An orientation of the sensor unit should be understood to mean the spatial alignment thereof in relation to a coordinate system of the vehicle such that, if the orientation is known, sensor signals such as e.g. an acceleration value in a certain direction can be uniquely assigned to a vehicle direction (e.g. a vehicle longitudinal direction, a vertical direction, or a vehicle transverse direction). Consequently, the sensor unit can be calibrated accordingly, but an incorrect installation can also be determined.

Within the scope of the present invention, the phrase "capturing sensor signals" is interpreted broadly and it comprises not only the readout of a corresponding sensor signal but also a query or simple reception of sensor signals which, for example, are provided by a control unit.

In general, the acceleration-free state or the rest state can be defined as a state in which only gravity acts on the vehicle, i.e. the vehicle may be at a standstill or move with a constant, straight-line speed or said vehicle can simply coast.

The linear acceleration may relate to both an increase in speed and a decrease in speed (i.e. braking). Consequently, the rest state can be measured at a movement with a constant speed that differs from zero and the second sensor signal is captured during subsequent braking.

In the absence of an unambiguous reference thereto, a parallel alignment in the present application should also include the case of an antiparallel alignment (i.e. straight lines that are not parallel are not antiparallel either).

The aforementioned object is achieved by the present invention in that a first sensor signal is used to find or define a vertical direction on the basis of the gravitational acceleration and the second sensor signal (an acceleration value) is used during a linear acceleration in order to define a longitudinal direction of the vehicle using the direction of the linear acceleration or to determine a potential rotation about the vertical axis.

In particular, the sensor unit can be arranged in or at an ESP unit such that the orientation of the ESP unit is likewise known once the sensor unit has been appropriately measured. There is therefore no need for cornering in order, for example, to calibrate yaw rate sensors in the ESP unit since the determination of the orientation of the sensor unit likewise makes known an orientation of the sensors present in the ESP unit, such as e.g. the yaw rate sensor. As mentioned previously, the rest state can be examined before starting the vehicle, and so a simple acceleration of the vehicle along a relatively short path already renders it possible to determine whether the exemplary ESP unit was installed correctly.

The employed acceleration sensor can output sensor signals for a first acceleration axis, a second acceleration axis, and a third acceleration axis and the vehicle defines a longitudinal axis, a transverse axis, and a vertical axis, wherein the vertical axis is parallel to a gravitational acceleration vector and the longitudinal axis is parallel to the linear acceleration. Using these definitions, the step of ascertainment may further comprise the following: from the first sensor signal, a first angle of a rotation about the longitudinal axis and a second angle of a rotation about the transverse axis are ascertained. The first angle and the second angle are defined such that the associated rotations align the gravitational acceleration vector parallel (or antiparallel) to the vertical axis.

Moreover, storing the alignment rotation defined by the first angle and the second angle may be comprised in order to facilitate a transformation such that sensor signals of the acceleration sensor in the rest state of the vehicle only indicate an acceleration along the third acceleration axis. Consequently, the acceleration sensor would be correctly calibrated.

Naturally, the defined transformation need not necessarily be carried out. Rather, it is sufficient if the corresponding angles are known such that the corresponding sensor signals that are captured by the exemplary ESP unit can be interpreted correctly. A possible installation at an angle can be compensated thereby. Likewise, the ascertained angles may also only serve the purpose of warning the driver about an incorrect installation in the case of a tolerance deviation from an ideal installation being exceeded. Thereupon, it is then possible to check the installation.

Ascertaining the orientation by means of the aforementioned angles is one option. Moreover, there are a plurality of mathematically equivalent options for determining a spatial rotation of the sensor unit in relation to the vehicle and carrying out the corresponding parameterization such that the correct installation can be determined or possible inclinations can be compensated appropriately and the sensor signals can be interpreted correctly.

The acceleration sensor can be a three-dimensional (3-D) sensor, for example, and consequently determine three independent acceleration values for three axes (directions). The aforementioned axes need not necessarily be orthogonal to one another but should be linearly independent of one another. Naturally, a 3-D acceleration sensor can be constructed from a plurality of independent one-dimensional (1-D) and/or two-dimensional (2-D) acceleration sensors (which are able to independently measure one or two accelerations).

In further exemplary embodiments, the first method moreover comprises capturing a movement signal from at least one movement sensor and determining a vehicle standstill (or an acceleration-free state) on the basis of the movement signal.

The present invention likewise relates to a second method for determining an orientation of a sensor unit of a vehicle, wherein a longitudinal axis, a transverse axis, and a vertical axis are once again defined for the vehicle. The vertical axis is parallel to a gravitational acceleration vector and the sensor unit has at least one acceleration sensor with a predetermined alignment in relation to the vertical axis and said sensor unit is embodied to output sensor signals for a first acceleration axis and a second acceleration axis, which are different from the vertical axis. The second method comprises the steps of: capturing an acceleration sensor signal (second sensor signal) of the acceleration sensor in response to a linear acceleration of the vehicle along the longitudinal axis, and ascertaining the orientation of the sensor unit in a plane spanned by the longitudinal axis and the transverse axis on the basis of the captured acceleration sensor signal.

In further exemplary embodiments, the methods moreover comprise ascertaining, from the second sensor signal, a third angle of a rotation about the third acceleration axis. The third angle is defined in that the associated rotation aligns the linear acceleration of the vehicle parallel or antiparallel to the first acceleration axis.

Optionally, the methods further comprise storing the compensation rotation defined by the third angle in order to facilitate a transformation such that sensor signals of the acceleration sensor only indicate an acceleration along the first acceleration axis in the case of accelerations along the longitudinal axis of the vehicle.

The methods are preferably carried out during a straight-line travel (or rest state) of the vehicle. However, this cannot always be ensured. Therefore, the vehicle optionally comprises one or more further sensors which directly or indirectly capture a rotation of at least one vehicle wheel in order thus to ascertain a speed and, from the time profile thereof, an acceleration. Therefore, the methods may further comprise the following steps: ascertaining an acceleration value of the vehicle by capturing sensor signals from the further sensor; ascertaining an absolute value of the linear acceleration on the basis of the second sensor signal; and determining a deviation of the acceleration value from the absolute value of the linear acceleration and taking account of the deviation in the step of ascertaining the orientation.

In further exemplary embodiments, the methods moreover comprise outputting a warning if the ascertained orientation of the sensor unit signals an incorrect installation. The incorrect installation can be defined as a deviation from a normal state.

Exemplary embodiments also comprise a storage medium with a computer program stored thereon, said computer program being embodied to prompt an apparatus to carry out one of the above-described methods when said computer program runs on a processor (processing unit). The storage medium can be a machine-readable medium which contains a mechanism for storing or transferring data in a machine-readable form (e.g. readable by a computer). By way of example, the apparatus can be a control unit having a processor on which the computer program runs.

Consequently, the present invention likewise relates to an apparatus for determining an orientation of a sensor unit, wherein the sensor unit has at least one acceleration sensor and said sensor unit is installed in a vehicle. By way of example, the apparatus is the aforementioned control unit which carries out the above-described method and which comprises the following features: a capture unit for capturing a first sensor signal from the acceleration sensor in an acceleration-free state of the vehicle and/or a second sensor signal from the acceleration sensor in response to a linear acceleration of the vehicle. The apparatus further comprises a processing unit for ascertaining the orientation of the sensor unit relative to the vehicle on the basis of the first sensor signal and/or the second sensor signal. The storage unit serves to store the results (e.g. the ascertained angles).

In the apparatus, the acceleration sensor may be the aforementioned three-axis acceleration sensor which may have a predetermined spatial orientation in relation to an ESP installed in the vehicle such that the ascertained orientation of the sensor unit likewise indicates the orientation of the ESP. Optionally, the acceleration sensor may also be integrated in the ESP and it may be housed together with the ESP in a common housing.

The present also relates to a vehicle having a sensor unit having at least one acceleration sensor, and an above-described apparatus.

The exemplary embodiments of the present invention will be better understood on the basis of the following detailed description and the attached drawings of the different exemplary embodiments; however, these should not be understood as limiting the disclosure to specific embodiments but only serve explanatory purposes and for the understanding thereof.

DETAILED DESCRIPTION

Figure 1A:
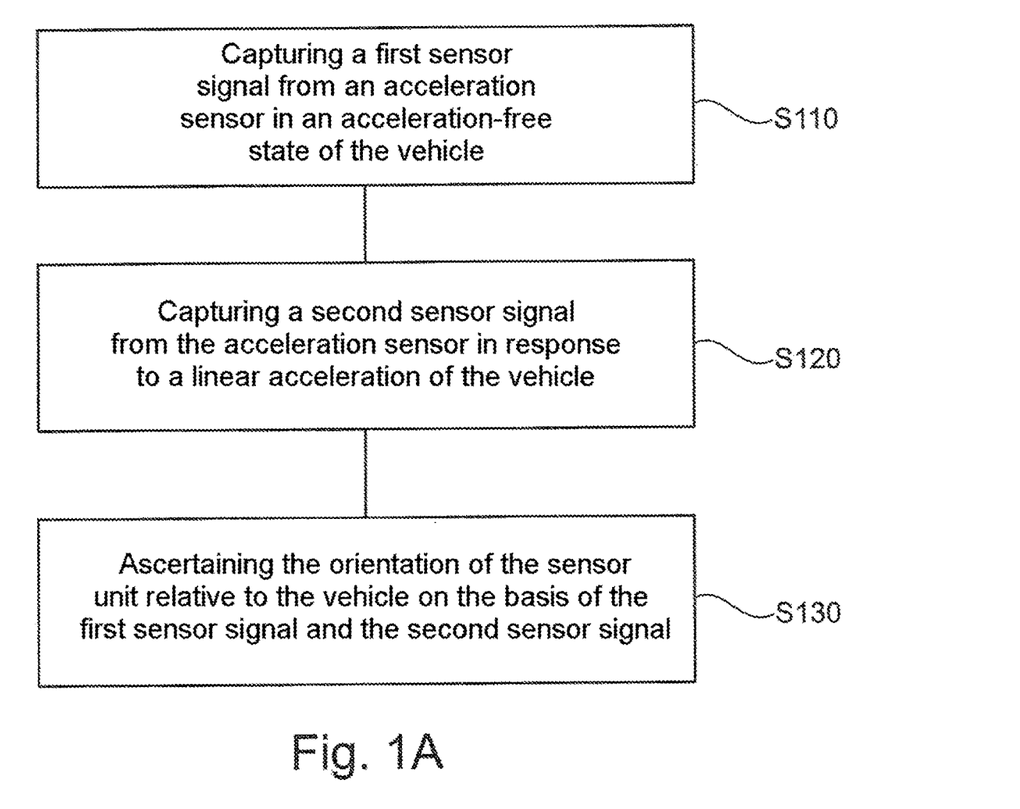
FIG. 1A shows a flowchart of a method for determining an orientation of a sensor unit according to exemplary embodiments of the present invention.
Figure 1B:
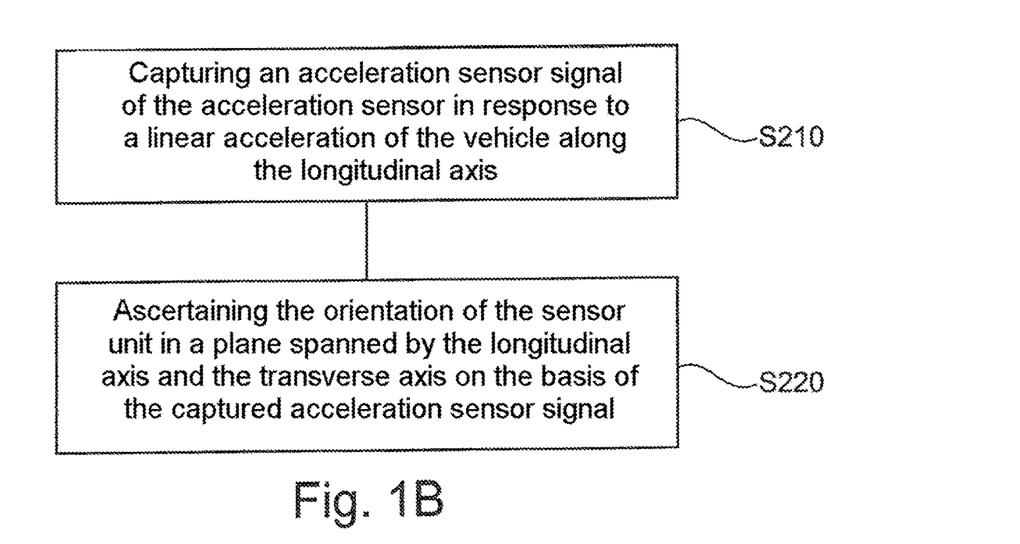
FIG. 1B shows another flowchart of a method for determining an orientation of a sensor unit according to exemplary embodiments of the present invention.

FIGS. 1A,B show flowcharts of methods for determining an orientation of a sensor unit according to exemplary embodiments of the present invention.

FIG. 1A elucidates a first method for determining an orientation of a sensor unit. The sensor unit has at least one acceleration sensor and said sensor unit is installed in a vehicle. The method comprises the steps of: capturing S110 a first sensor signal from the acceleration sensor in an acceleration-free state of the vehicle; capturing S120 a second sensor signal from the acceleration sensor in response to a linear acceleration of the vehicle; and ascertaining S130 the orientation of the sensor unit relative to the vehicle on the basis of the first sensor signal and the second sensor signal.

FIG. 1B elucidates a second method for determining an orientation of a sensor unit of the vehicle, wherein the vehicle defines a longitudinal axis, a transverse axis, and a vertical axis. The vertical axis is parallel to a gravitational acceleration vector (under the assumption that the vehicle is upright). The sensor unit comprises at least one acceleration sensor and said sensor unit is embodied to output sensor signals (i.e. acceleration values) for a first acceleration axis and a second acceleration axis which differ from the vertical axis z. In contrast to the first method, the assumption is made here that the acceleration sensor has a predetermined alignment in relation to the vertical axis. The second method comprises the steps of: capturing S210 an acceleration sensor signal (second sensor signal) of the acceleration sensor in response to a linear acceleration of the vehicle along the longitudinal axis; and ascertaining S220 the orientation of the sensor unit in a plane spanned by the longitudinal axis and the transverse axis of the vehicle on the basis of the captured acceleration sensor signal.

Figure 2:
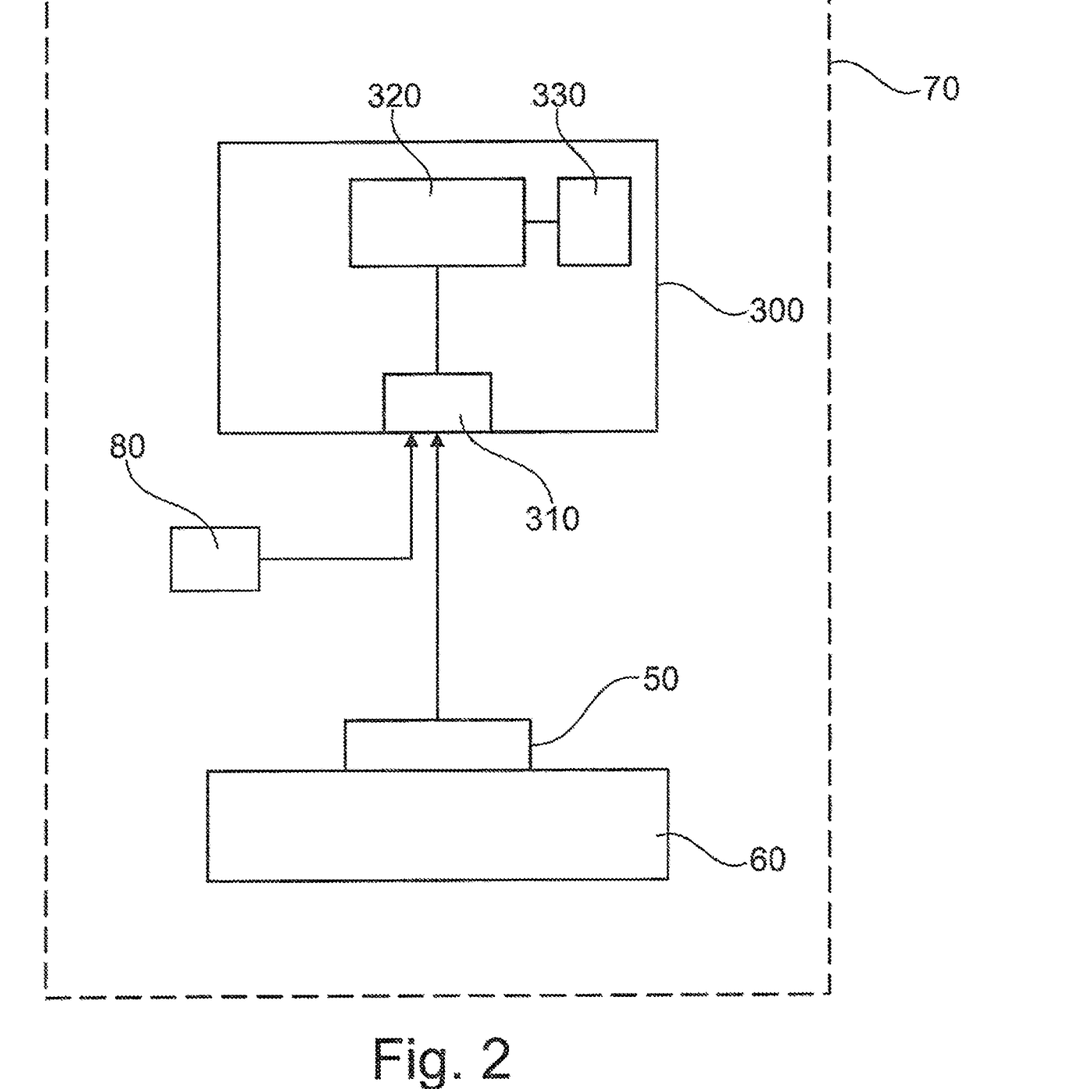
FIG. 2 shows an apparatus for determining an orientation of a sensor unit according to exemplary embodiments of the present invention.

FIG. 2 shows an apparatus 300 for carrying out the first method and/or the second method for determining the orientation of a sensor unit 50 attached to a vehicle 70. The apparatus 300 comprises a capture unit 310, a processing unit 320 and an optional storage unit 330. The capture unit 310 is embodied to receive sensor signals from a sensor unit 50 (e.g. an acceleration sensor) and optionally from one or more further sensors 80. The received sensor signals are transmitted to a processing unit 320, where the sensor signals are evaluated.

In the implementation of the first method, the processing unit 320 evaluates two measurements. In one measurement, an acceleration-free state (e.g. a state at rest) of the vehicle 70 is determined and the gravitational acceleration (in particular the direction thereof) is measured by the acceleration sensor 50 (as the first sensor signal) in this state. This result is used to determine a possible rotation of the sensor unit 50 from the upright position. This rotation can be defined by way of transformations (e.g. rotations) which align the gravitational acceleration vector along the vertical axis of the sensor unit 50. In a further measurement, the resultant acceleration (in particular the direction thereof) is measured by the acceleration sensor 50 (as the second sensor signal) during a linear acceleration of the vehicle along the vehicle longitudinal axis. This result is used to determine a possible rotation of the sensor unit 50 about the vertical axis. This rotation corresponds to that rotational transformation which brings the captured linear acceleration vector into the direction of the linear acceleration. By way of example, if the linear acceleration is along the vehicle longitudinal direction without a cornering maneuver being carried out, the rotational transformation transforms the measured acceleration vector in such a way that it points along the vehicle longitudinal axis.

By way of example, the acceleration sensor 50 is a rotation rate and acceleration unit which can be packaged in a separate housing and assembled on a vehicle chassis. By way of example, the apparatus can be an ESP controller to which the sensor unit 50 is connected and which evaluates the signals and consequently identifies a possible incorrect spatial orientation of the installation of the sensor unit in good time.

Ascertaining the rotations can consequently indicate, firstly, that the sensor unit 50 or the ESP unit 60 was incorrectly installed in the vehicle 70. In this case, an appropriate warning may be output. However, the ascertained transformation can also be used to calibrate the sensor unit 50 or the ESP unit 60 in order thus to increase the measurement accuracy. In this case, it need not be necessary to undertake a correction of installation. Rather, the deviation from the ideal installation can be taken into account automatically.

In contrast to conventional methods, only a short acceleration or braking path needs to be covered using this procedure (for example before or after a brief standstill) in order to determine how the sensor unit 50 is installed in the vehicle 70.

By way of example, the sensor unit 50 can be embodied as a three-dimensional acceleration sensor (or as two two-dimensional acceleration sensors) and can couple to an ESP unit 60 in such a way that said acceleration sensor has a fixed relationship (i.e. orientation) with respect to the exemplary ESP unit. Hence, it is possible to deduce an orientation of the ESP unit 60 relative to the vehicle 70 from the measured acceleration values of the acceleration sensor 50. Optionally, it is likewise possible for the three-dimensional acceleration sensor 50 to be part of the exemplary ESP unit 60 or to be integrated into the latter. By way of example, the ESP unit itself may comprise one or more acceleration sensors which are able to produce sensor signals and ascertain the accelerations in three separate spatial directions. Therefore, the sensor unit 50 may also be integrated in a controller such as e.g. the ESP unit in order thus to automatically ascertain the correct spatial orientation of the installation of the controller.

However, the acceleration sensor 50 need not necessarily be a three-dimensional acceleration sensor. It may likewise be embodied as a two-dimensional acceleration sensor, and so it only determines two independent acceleration values with respect to two independent spatial directions. Such an acceleration sensor is sufficient for implementing the second method. However, in this case, it is important that the two-dimensional acceleration sensor 50 couples to the exemplary ESP unit 60 in such a way that the two determinable acceleration values do not lie parallel or antiparallel to the vertical alignment of the vehicle 70, but preferably in a plane perpendicular thereto. However, it is further important for the calibration of the sensor unit 50 in this case that the installation of the exemplary ESP unit 60 or of the sensor unit 50 is known or predetermined in respect of the vertical direction such that it is only necessary to compensate or it is only possible to determine an uncertainty in respect of the rotation about the vertical axis. Determining this rotation is carried out in the same way as described in the first method, i.e. by way of an acceleration measurement during a linear acceleration of the vehicle and the determination of the direction of the measured acceleration vector.

The further sensors 80 comprise, for example, at least one movement sensor or sensors which capture the rotational speed of the motor or which detect a rotation of the wheels or the rotational speed thereof. Likewise, there may be sensors present that detect a steering angle and consequently indicate a cornering maneuver. By way of example, all of these further sensors are coupled via the wheels and respond to a corresponding acceleration of the vehicle 70, without resorting to the exemplary ESP unit 60 which is independent of these sensors 80. The function thereof is described in more detail below.

FIGS. 3 to 10 show further details of the exemplary procedure for ascertaining the orientation of the sensor unit 50.

Figure 3:
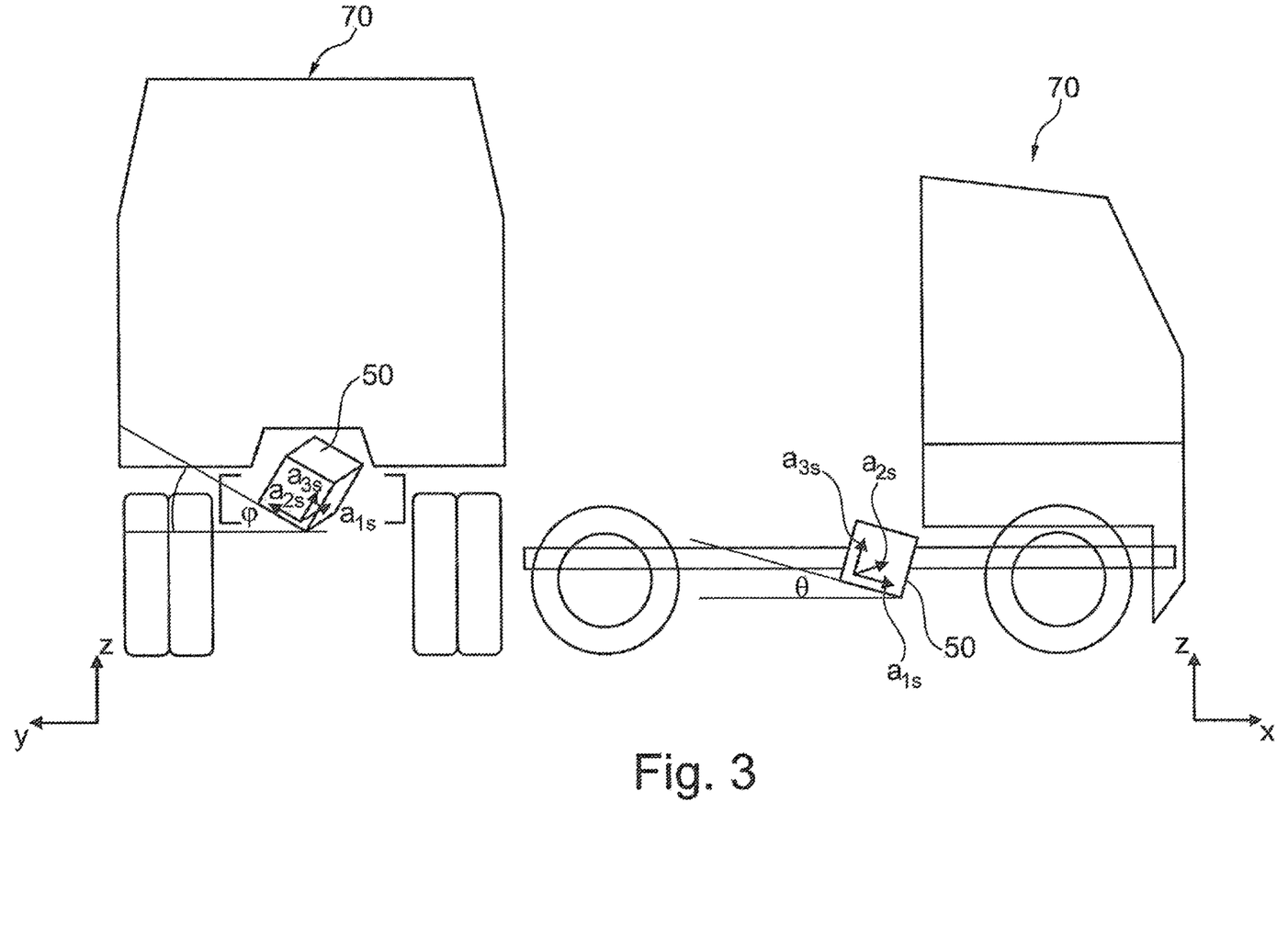
FIG. 3 shows an exemplary vehicle with an installed sensor unit when the vehicle is at a standstill.

FIG. 3 initially shows the vehicle 70 from a rear view (left-hand side) and from a side view (right-hand side). Here, the coordinate system is selected in such a way that the x-axis extends to the front along the vehicle longitudinal direction, the z-axis represents the vertical direction and the y-axis represents the vehicle transverse direction. An exemplary sensor unit 50 is shown in the vehicle, said sensor unit being inclined relative to the (global) xyz-coordinate system of the vehicle 70, i.e. the dedicated (local) reference system of the sensor unit 50 consisting of the (orthogonal) directions $a_{1s}$, $a_{2s}$, $a_{3s}$ is rotated in relation to the global xyz-coordinate system. By way of example, the sensor unit 50 may be inclined by an angle $\varphi$ relative to the y-axis and by an angle $\theta$ relative to the x-axis. The angle $\varphi$ is also known as the roll angle and the angle $\theta$ is known as the so-called pitch angle. The choice of the axis direction is freely selectable to the greatest possible extent, and so one or more of the shown axes point in an opposite direction or else are not at right angles to one another in other coordinate systems.

In order to ascertain the inclination of the sensor unit 50 relative to the vehicle 70, as described above, the alignment of the gravitational vector g is ascertained in the non-accelerated state (e.g. at a standstill) in one measurement step. Below, the vehicle is assumed to be at a standstill in this measurement step, even though the present invention is not restricted thereto. All that is important is that no other acceleration that differs from the gravitational acceleration g acts on the vehicle 70 during this measurement step.

Figure 4:
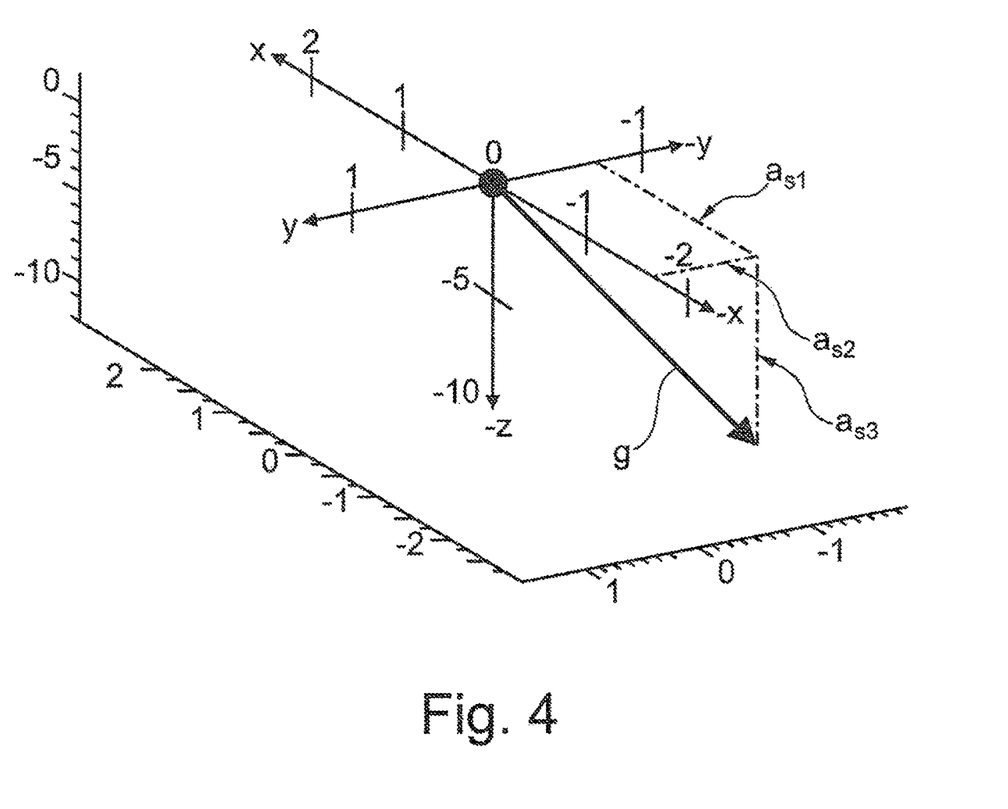
FIG. 4 shows an exemplary alignment of a measured acceleration vector during the vehicle standstill.

FIG. 4 shows an exemplary alignment of a measured gravitational acceleration vector g during the exemplary vehicle standstill, as shown in FIG. 3. Since the vehicle 70 is at a standstill, only the gravitational acceleration g acts on the vehicle 70; said gravitational acceleration is measured by the sensor unit 50. In the shown example, the gravitational acceleration g is not aligned along the negative z-axis but has a value $a_{s1}$ along the negative x-axis, a value $a_{s2}$ along the negative y-axis and a value $a_{s3}$ along the negative z-axis.

By way of example, the shown vehicle standstill can be determined on the basis of a wheel rotational speed using corresponding sensor signals or other vehicle measurement values (such as e.g. from a parking brake, information about a selected gear or the motor operation). To this end, use can be made of the above-described further sensors 80. It is likewise possible to recognize the vehicle 70 standstill by way of ESP sensor signals (rotation rates and other acceleration signals).

By definition, only the gravitational acceleration g acts on the vehicle 70 when the vehicle is at a standstill, and so the following equation applies for the measured acceleration:

$$a_{1s}^2 + a_{2s}^2 + a_{3s}^2 = g^2. \tag{1}$$

In order to be able to take appropriate account of the non-erect orientation of the sensor unit 50, illustrated in FIG. 3, in subsequent measurements (or in order to signal an incorrect installation), the static roll and pitch angles are aligned in the following steps. This means that, after ascertaining these angles by corresponding compensation rotations, the measured acceleration values can be initially transformed into a coordinate system in which the gravitational acceleration g only acts in one direction, which can be defined to be the vertical direction.

This can be effectuated in two steps. In a first step, the measured acceleration vector is initially rotated about its x-axis such that the y-component of the measured acceleration vector disappears. This compensation rotation corresponds to the following transformation:

$$\begin{pmatrix} a_{1x} \\ a_{2x} \\ a_{3x} \end{pmatrix} = \begin{pmatrix} 1 & 0 & 0 \\ 0 & \cos\varphi & -\sin\varphi \\ 0 & \sin\varphi & \cos\varphi \end{pmatrix} \begin{pmatrix} a_1 \\ a_2 \\ a_3 \end{pmatrix} \tag{2}$$

where:

$$\sin\varphi = \frac{a_{2s}}{\sqrt{a_{2s}^2 + a_{3s}^2}}. \tag{3}$$

Figure 5:
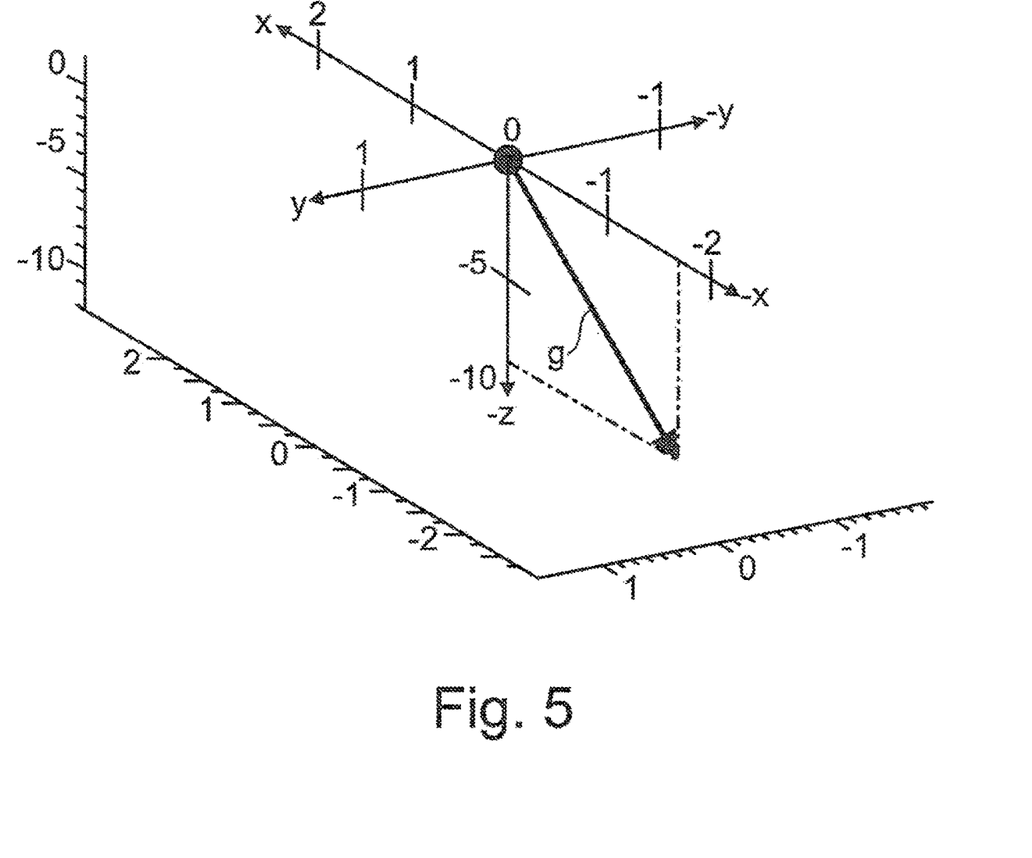
FIG. 5 shows the result of a rotation about an x-axis.

FIG. 5 shows the result of this rotation, i.e. the rotated acceleration vector g has no component along the y-axis, but only a z-component and an x-component.

In the next step, the vector of FIG. 5 is rotated again, to be precise about the y-axis such that the resultant vector is perpendicular to the xy-plane (i.e. it is parallel to the z-axis). The rotation required to this end is defined as follows:

$$\begin{pmatrix} a_{1xy} \\ a_{2xy} \\ a_z \end{pmatrix} = \begin{pmatrix} \cos\theta & 0 & \sin\theta \\ 0 & 1 & 0 \\ -\sin\theta & 0 & \cos\theta \end{pmatrix} \begin{pmatrix} a_{1x} \\ a_{2x} \\ a_{3x} \end{pmatrix} \quad (4)$$

where $$\sin\theta = -\frac{a_{1X}}{\sqrt{a_{1X}^2 + a_{3X}^2}}. \quad (5)$$

Figure 6:
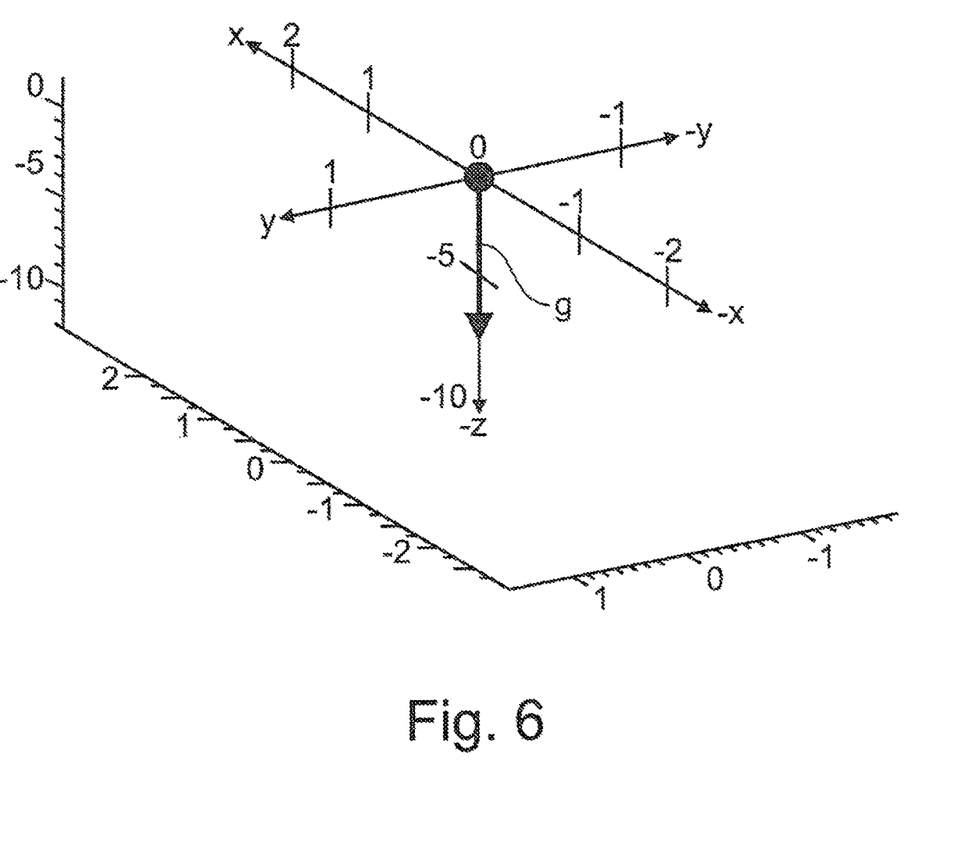
FIG. 6 shows the result of a subsequent rotation about a y-axis.

FIG. 6 shows the result of the two rotations from equations (2) to (5), in which the acceleration vector g no longer has an x-component and a y-component, and it is aligned parallel to the z-axis.

However, the sensor unit 50 may possibly also still be rotated through an angle ψ about the z-axis (i.e. in the xy-plane). A further procedure relating to how this rotation is also determinable is described below.

Figure 7:
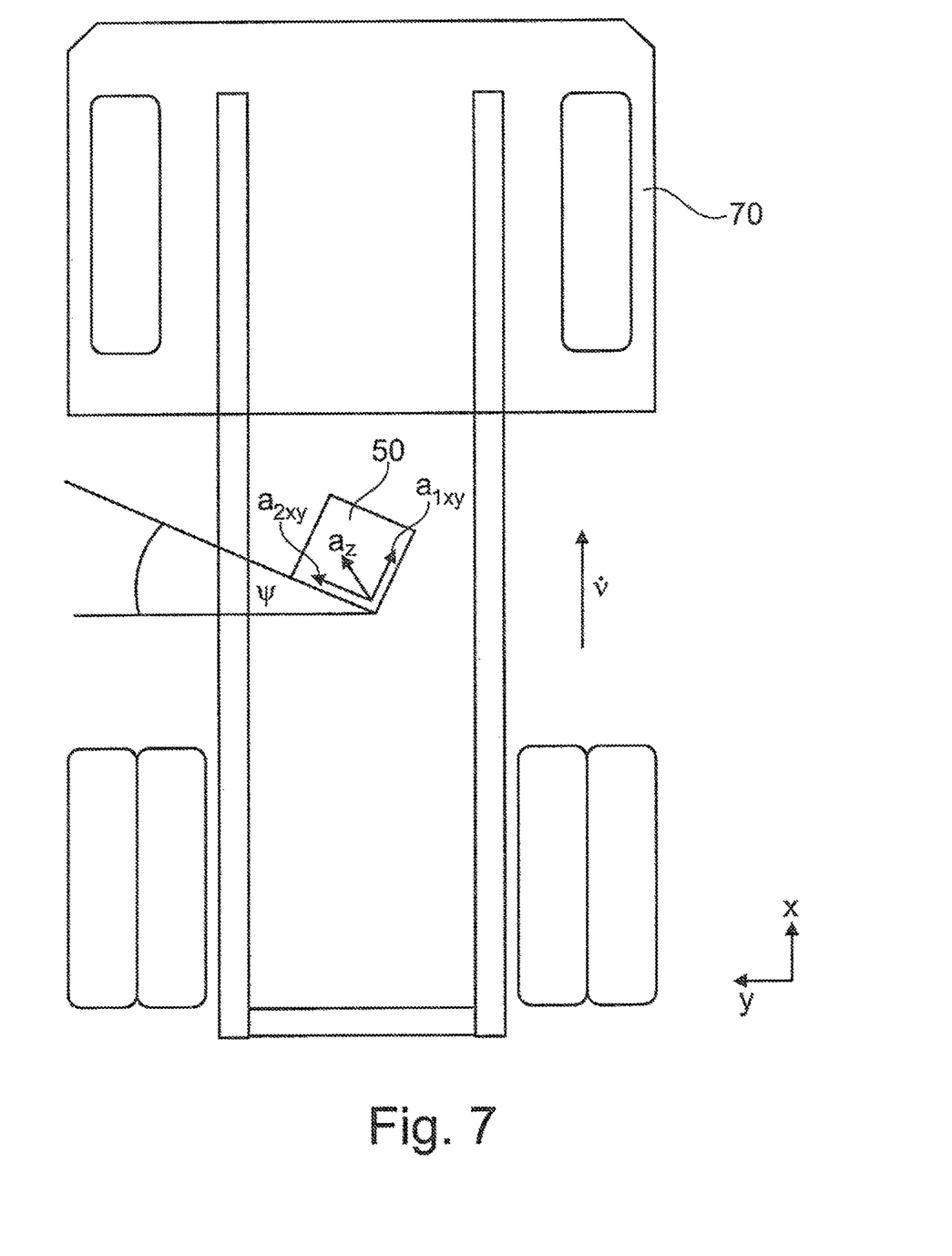
FIG. 7 shows the vehicle with a sensor unit that is rotated in the xy-plane.

FIG. 7 initially shows the vehicle 70 in a plan view, wherein the sensor unit 50 is rotated through an angle ψ about the z-axis (i.e. in the xy-plane). In order to determine this rotation, a linear acceleration or a straight-line acceleration of the vehicle 70 is carried out as the next step such that the acceleration vector of the vehicle $\dot{v}$ is added to the gravitational acceleration g and it supplies an overall acceleration vector which can be captured by the sensor unit 50.

Optionally, the current speed of the vehicle v can be ascertained from wheel rotational speeds or angular velocities $\omega_1 \ldots \omega_n$, for example, where n is the number of measurements at the different wheels (n≥1). By way of example, the angular velocities can be measured by wheel rotational speed sensors (preferably on the non-driven wheels in order to exclude slip). If the various wheels have diameters $r_1 \ldots r_n$, the following emerges for the speed of the vehicle (as an average of the n measurements):

$$v_{vehicle} = \frac{\sum_{i=1}^{n} \omega_i \cdot r_i}{n} \quad (6)$$

and for the current acceleration thereof:

$$\dot{v} = \frac{dv_{vehicle}}{dt} \quad (7)$$

This acceleration is added as a vector to the previously determined gravitational acceleration g (see FIG. 4). Under the assumption that the linear acceleration of the vehicle 70 is carried out in the x-direction, $\dot{v}$ only only acts in the x-direction. The magnitude of the overall acceleration (a1, a2, a3) is consequently given by:

$$a_1^2 + a_2^2 + a_3^2 = g^2 + \dot{v}^2 \quad (8)$$

Since a lateral drift of the vehicle or unevenness or inclined spatial orientations of the vehicle leading to different acceleration values can never be completely precluded during a movement of the vehicle, there optionally can still be an ascertainment on the basis of rotational speeds of the driven wheels as to whether the acceleration values in fact correspond to the measured values.

To this end, use can be made of the above-described further sensors 80, for example. By way of example, these can be used to ascertain how the speed of the wheels changes in order to ascertain the acceleration value therefrom using a temporal sequence of additional sensor signals. Since this acceleration value is ascertained from the rotations of the wheels, it only captures the increase in speed of the vehicle 70 relative to the ground and it is not sensitive in relation to deviations from the linear acceleration. On the other hand, the acceleration sensor 50 measures the acceleration independently of the cause of the acceleration, i.e. it measures a superposition of all accelerations (gravitation, vehicle accelerations, cornering, change in the ground, etc.). Consequently, these further sensors 80 can be effectively used to ascertain further accelerations which are superposed on the linear acceleration and which can falsify the result. Therefore, it is likewise possible to determine whether the ground is inclined or whether the vehicle is driving downhill or uphill or with a lateral inclination. This can also be used to determine unevenness of the ground, which could likewise lead to a falsification of the signal.

In order to achieve this, the acceleration sensor 50 can not only ascertain the direction of the acceleration but likewise captures the absolute value of the acceleration. If the vehicle 70 is accelerated strictly horizontally and strictly in a straight line, and if a deviation from the vertical has already been taken into account, the absolute value of the acceleration from the acceleration sensor 50 corresponds to the acceleration value of the further sensors. The measurement conditions were not ideal if there is a deviation. The result, i.e. the captured deviation, can be communicated to a driver, for example, such that they can repeat the test under different conditions. It is likewise possible to take account of the deviation when ascertaining the orientation or compensate the additional acceleration such that the results are not falsified.

Figure 8:
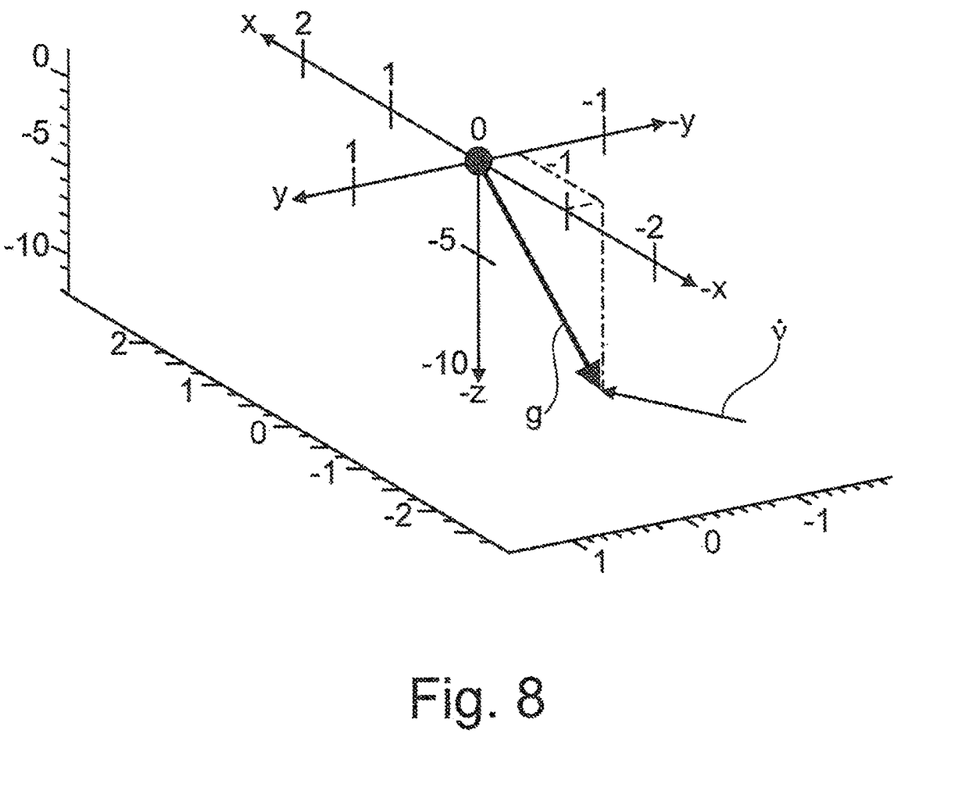
FIG. 8 shows the superimposed gravitational acceleration with a vehicle acceleration prior to a compensation of rotations.

FIG. 8 shows a superposition of the vehicle acceleration $\dot{v}$ and the gravitational acceleration g measured in the rest state.

Figure 9:
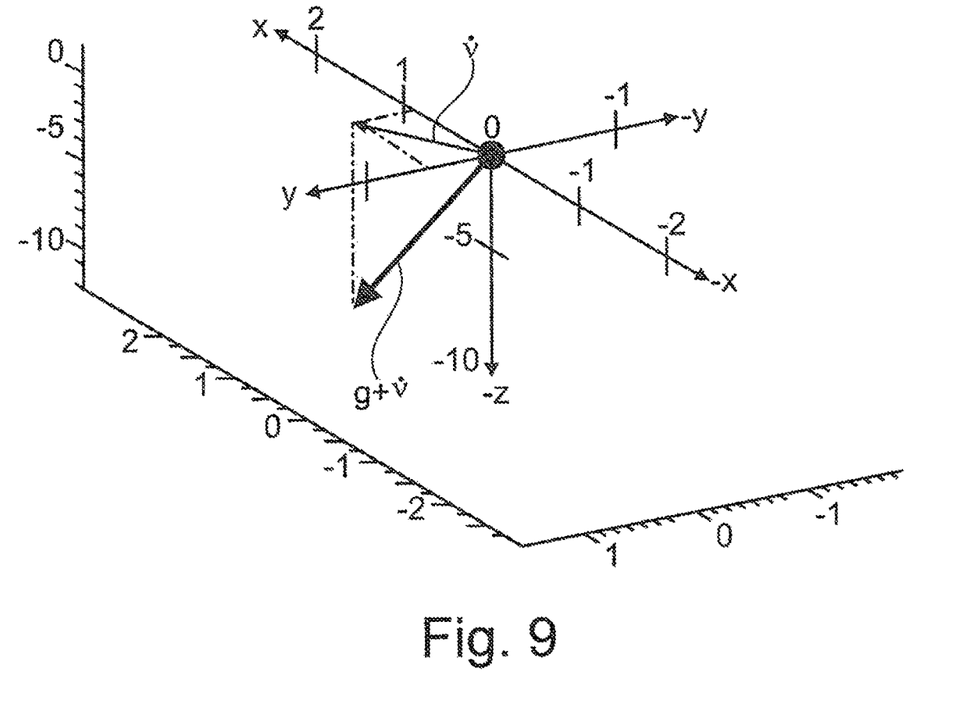
FIG. 9 shows the resultant overall acceleration after compensating rotations from an upright position.

FIG. 9 shows the overall acceleration $g+\dot{v}$ as a vector addition of the gravitational acceleration g and the vehicle acceleration $\dot{v}$, wherein the known rotations about the x-axis and y-axis were already taken into account (compensated) such that the gravitational acceleration g only acts along the z-axis and the effective longitudinal acceleration $\dot{v}$ lies in the xy-plane.

Under the assumption that the linear acceleration $\dot{v}$ of the vehicle 70 only defines an ax-acceleration (along the vehicle longitudinal axis), the rotation through a rotation angle ψ in the xy-plane (around the z-axis) is given by the following transformation:

$$\begin{pmatrix} a_x \\ a_y \\ a_z \end{pmatrix} = \begin{pmatrix} \cos\psi & -\sin\psi & 0 \\ \sin\psi & \cos\psi & 0 \\ 0 & 0 & 1 \end{pmatrix} \begin{pmatrix} a_{1xy} \\ a_{2xy} \\ a_z \end{pmatrix} \quad (9)$$

where $$\cos\psi = -\frac{a_{1x}}{\dot{v}} \text{ and } \sin\psi = \frac{a_{2X}}{\dot{v}} \quad (10)$$

(under the above assumption, $a_z=0$).

Figure 10:
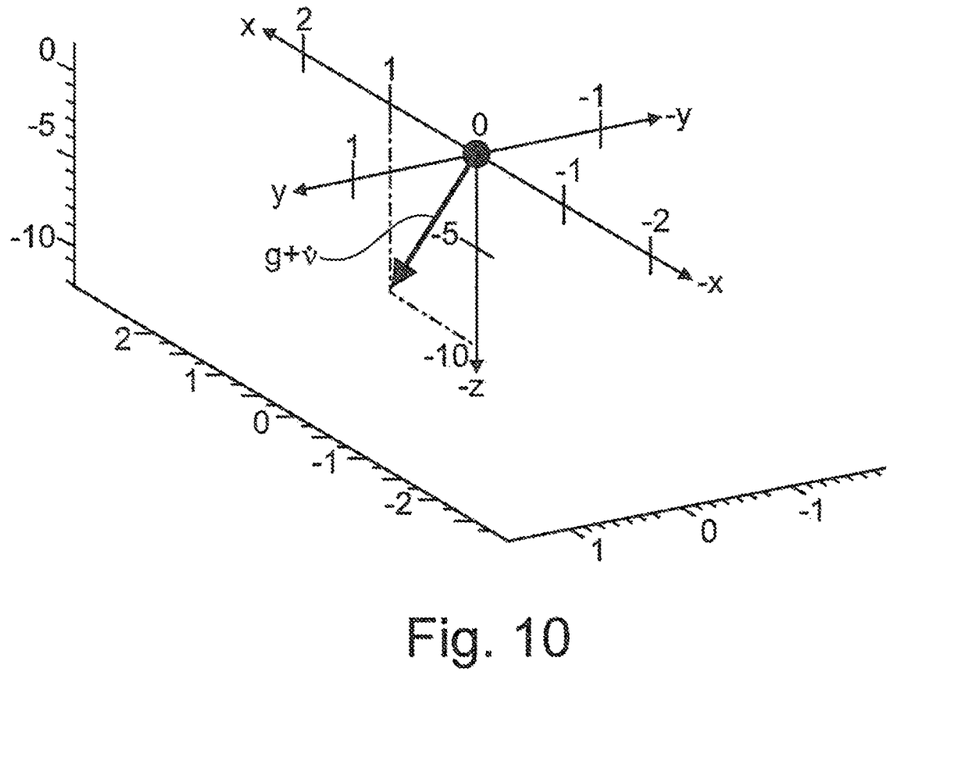
FIG. 10 shows the final result after compensating all rotations of the sensor unit.

FIG. 10 shows the final result, in which the component $\dot{v}$ after the undertaken normalization is only aligned along the x-axis. Accordingly, the linear acceleration causes an effective rotation of the acceleration vector about the y-axis (i.e. out of the z-axis).

In conclusion, it is consequently possible to transform the three measured accelerations of the sensor unit 50 into the vehicle acceleration in the vehicle coordinate system (see FIG. 2) by way of the following transformation:

$$\begin{pmatrix} a_x \\ a_y \\ a_z \end{pmatrix} = \begin{pmatrix} \cos\psi & -\sin\psi & 0 \\ \sin\psi & \cos\psi & 0 \\ 0 & 0 & 1 \end{pmatrix} \begin{pmatrix} \cos\theta & 0 & \sin\theta \\ 0 & 1 & 0 \\ -\sin\theta & 0 & \cos\theta \end{pmatrix} \begin{pmatrix} 1 & 0 & 0 \\ 0 & \cos\varphi & -\sin\varphi \\ 0 & \sin\varphi & \cos\varphi \end{pmatrix} \begin{pmatrix} a_{S1} \\ a_{S2} \\ a_{S3} \end{pmatrix} \quad (11)$$

The angles $\varphi$ and $\theta$ are determined by virtue of the gravitational acceleration g only being aligned along the z-axis and the angle $\psi$ is defined by virtue of the vehicle acceleration $\dot{v}$ only having a component along the x-axis.

What emerges from the procedure illustrated until now is that an acceleration can be determined by a corresponding sensor signal for each rotation of the sensor unit 50 relative to the vehicle coordinate system. Therefore, a three-dimensional or 3-axis sensor signal is required for general rotation in all three spatial directions, said sensor signal being able to capture rotations about the pitch angle, about the roll angle and also rotations about the vertical axis.

Such a three-dimensional sensor signal can be produced by a sensor unit 50 which is coupled to the exemplary ESP unit in order thus to determine an orientation of the ESP unit. However, the ESP unit itself need not have a three-dimensional acceleration sensor. In this case, it is possible to provide an additional three-dimensional acceleration sensor which has a fixed orientation in relation to the sensor unit 50 and which can be used for calibrating the sensor unit 50.

However, if neither the sensor unit 50 nor a further independent acceleration sensor is able to capture all three spatial directions, use can likewise be made of a two-dimensional sensor element for determining an orientation of the sensor unit 50. However, since it is not possible to capture all three spatial directions using a two-dimensional sensor unit, it is important in this case that the sensor unit already ensures a perpendicular installation relative to the vertical axis or said sensor unit has a predetermined angle in relation to the vertical axis.

If this is ensured, it is possible to dispense with the steps up to equation (5) since the gravitational vector g is already aligned parallel to the z-axis or it is already appropriately transformable on account of the fixed predetermined angle. In this case, it is only necessary to carry out the steps that were described by equations (6) to (10).

If the two-dimensional sensor element is not strictly aligned on the z-axis or if the vehicle is inclined when at a standstill (on a slope), for example, this deviation can be taken into account as a sensor offset at a standstill and may be aligned accordingly.

Advantages of exemplary embodiments of the present invention and the essential aspects thereof can be summarized as set forth below.

The present invention facilitates a quick and reliable check of the orientation of a sensor unit 50, such as e.g. an ESP unit 60, by way of the described methods. It is likewise possible to continuously monitor the sensor unit 50 or the alignment thereof (e.g. prior to the start of each journey or even during the journey), and so it is possible to relax the regulations in respect of an accurate installation. Therefore, the described procedure is advantageous for a continuous or regular control of the orientation of the sensor unit 50. By determining the orientation of the sensors, it is possible to ensure that the ESP operates as intended.

According to the present invention, accelerations from a sensor unit $a_1$, $a_2$, and optionally $a_3$, which are typically oriented orthogonal to one another, are aligned with the vehicle coordinate system $a_x$, $a_y$, $a_z$. Therefore, use is made not only of a transverse acceleration sensor but of a multi-axis acceleration sensor. If this is a three-dimensional acceleration sensor, the acceleration vector, including the component of the gravitational acceleration, acting on the sensor is directly measurable. If the vehicle is at a standstill (or has a monotonic movement at a constant speed), it is only the gravitational acceleration that acts, and so the spatial orientation of the sensor unit 50 with respect to the longitudinal axis and transverse axis can already be ascertained directly before the start of the journey and a warning can be output in the case of inadmissible deviations from the predetermined direction. Consequently, an incorrect spatial orientation of the installation is already identified before, or immediately at, the start of the journey and the driver can be warned in good time. Alternatively, it is possible to tolerate a deviation from the ideal spatial orientation of the installation, with the described procedure serving for the calibration (it compensates deviations from the ideal spatial orientation automatically).

A rotation about the vertical can be detected by a brief acceleration (e.g. when driving off). When driving off, which the ESP controller can identify from the CAN information from the drive and/or the signals of the wheel rotational speed sensors 80, the angle position at which the sensor unit 50 is assembled around the vertical axis is determined by means of the change in the acceleration signal ascertained by means of an acceleration sensor measuring at least in 2-D.

If the rotation about the vertical axis is known, it is possible to calculate the transverse acceleration, relevant to the ESP, from the magnitude and the direction of the acceleration vector or, if a certain installation direction about the vertical axis is prescribed, it is possible to output a warning if this deviates from the ascertained installation direction.

To this end, it is possible to measure the actual acceleration in the drive direction of the vehicle without acceleration components across the drive direction (cornering). This is possible by virtue of the steering angle sensor identifying that the steering is set to straight-ahead and signals (e.g. motor torque and rotational speed, clutch position, selected gear) from the vehicle communication bus (e.g. CAN J1939) identifying that the vehicle is now accelerated forward from a standstill.

Exemplary embodiments of the present invention therefore render it possible to already check the ESP unit without having to undertake a cornering maneuver which possibly already requires an ESP intervention. Moreover, it is possible that a possible necessary error warning on account of an incorrect spatial orientation of the installation is already identified without having to travel through a first curve.

Here, possible inclined locations of the vehicle in the drive direction or transversely thereto must be tolerated within permitted limits. However, a 2-D or 3-D acceleration sensor allows large deviations about the vertical axis to be tolerated or a predetermination of the installation direction about the vertical axis to be dispensed with.

The features of the invention disclosed in the description, the claims and the figures can be essential for implementing the invention both on their own and in any combination.

The list of reference signs is as follows:
50 Sensor unit
60 ESP unit
70 Vehicle
80 Further sensors
300 Apparatus for determining an orientation (control unit)
310 Capture unit
320 Processing unit
330 Storage unit
x, y, z Longitudinal axis, transverse axis, and vertical axis of the vehicle
a1 First acceleration axis
a2 Second acceleration axis
a3 Third acceleration axis
g Gravitational acceleration vector

The invention claimed is:

1. A method for identifying an installation direction of a sensor unit of a vehicle, which is an electronic stability (ESP) unit of the vehicle, by determining a directional orientation of the sensor unit in the vehicle, the sensor unit having at least one acceleration sensor, the method comprising: capturing, via the electronic stability (ESP) unit, a first sensor signal from the acceleration sensor in an acceleration-free state of the vehicle, wherein the acceleration-free state corresponds to a vertical acceleration; capturing, via the electronic stability (ESP) unit, a second sensor signal from the acceleration sensor in response to a linear acceleration of the vehicle; and ascertaining, via a processing unit, the orientation of the sensor unit relative to the vehicle based on the first sensor signal and the second sensor signal; wherein the vehicle has the electronic stability (ESP) unit, wherein the acceleration sensor is a three-axis acceleration sensor which has a predetermined spatial orientation in relation to the ESP unit such that the ascertained orientation of the sensor unit likewise indicates the orientation of the ESP unit, wherein the first sensor signal is used to define a vertical direction based on a gravitational acceleration and an acceleration value corresponding to the second sensor signal to define a longitudinal direction of the vehicle using the direction of the linear acceleration or to determine a potential rotation about the vertical axis, and wherein the sensor unit is arranged in or at the ESP unit such that the orientation of the ESP unit is likewise known, and wherein a rest state is examined before starting the vehicle, so that the linear acceleration of the vehicle along a linear path is used to determine whether the ESP unit is installed correctly.

2. The method of claim 1, wherein the acceleration sensor outputs sensor signals for a first acceleration axis, a second acceleration axis, and a third acceleration axis and the vehicle defines a longitudinal axis, a transverse axis, and a vertical axis, wherein the vertical axis is parallel to a gravitational acceleration vector and the longitudinal axis is parallel to the linear acceleration, wherein the ascertaining includes: ascertaining, from the first sensor signal, a first angle about the longitudinal axis and a second angle about the transverse axis, wherein the first angle and the second angle define associated rotations which rotate the gravitational acceleration vector parallel or antiparallel to the vertical axis; and storing the alignment rotation defined by the first angle and the second angle to facilitate a transformation such that sensor signals of the acceleration sensor in the acceleration-free state of the vehicle only indicate an acceleration along the third acceleration axis.

3. The method of claim 2, wherein the ascertaining includes:
ascertaining, from the second sensor signal, a third angle about the third acceleration axis, wherein the third angle defines an associated rotation which rotates the linear acceleration of the vehicle parallel or antiparallel to the first acceleration axis; and
storing the compensation rotation defined by the third angle to facilitate a transformation such that sensor signals of the acceleration sensor only indicate an acceleration along the first acceleration axis in the case of accelerations along the longitudinal axis of the vehicle.

4. The method of claim 1, wherein the vehicle has at least one movement sensor, further comprising:
capturing a movement signal from the at least one movement sensor; and
determining the acceleration-free state based on the movement signal.

5. The method of claim 1, wherein the vehicle includes a further sensor which directly or indirectly captures a rotation of at least one vehicle wheel, further comprising:
ascertaining an acceleration value of the vehicle by capturing sensor signals from the further sensor;
ascertaining an absolute value of the linear acceleration based on the second sensor signal; and
determining a deviation of the acceleration value from the absolute value of the linear acceleration and taking account of the deviation in the ascertaining of the orientation.

6. The method of claim 1, further comprising:
outputting a warning if the ascertained orientation of the sensor unit signals an incorrect installation.

7. The method of claim 1, wherein the method is performed while the vehicle is traveling in a straight line.

8. A method for identifying an installation direction of a sensor unit of a vehicle, which is an electronic stability (ESP) unit of the vehicle, by determining a directional orientation of the sensor unit in the vehicle, the method comprising: capturing, via the electronic stability (ESP) unit, a first sensor signal from the acceleration sensor in an acceleration-free state of the vehicle, wherein the acceleration-free state corresponds to a vertical acceleration; capturing, via the electronic stability (ESP) unit, a second sensor signal of the acceleration sensor in response to a linear acceleration of the vehicle along a longitudinal axis, wherein the vehicle defines the longitudinal axis, a transverse axis, and a vertical axis, wherein the vertical axis is parallel to a gravitational acceleration vector and the sensor unit has at least one acceleration sensor, wherein the acceleration sensor has a predetermined alignment in relation to the vertical axis and the acceleration sensor is configured to output sensor signals for a first acceleration axis and a second acceleration axis, which are different from the vertical axis; and ascertaining, via a processing unit, the orientation of the sensor unit in a plane spanned by the longitudinal axis and the transverse axis based on the captured second sensor signal; wherein the vehicle has the electronic stability (ESP) unit, wherein the acceleration sensor is a three-axis acceleration sensor which has a predetermined spatial orientation in relation to the ESP unit such that the ascertained orientation of the sensor unit likewise indicates the orientation of the ESP unit, wherein the first sensor signal is used to define a vertical direction based on a gravitational acceleration and an acceleration value corresponding to the second sensor signal to define a longitudinal direction of the vehicle using the direction of the linear acceleration or to determine a potential rotation about the vertical axis, and wherein the sensor unit is arranged in or at the ESP unit such that the orientation of the ESP unit is likewise known, and wherein a rest state is examined before starting the vehicle, so that the linear acceleration of the vehicle along a linear path is used to determine whether the ESP unit is installed correctly.

9. A non-transitory computer readable medium having a computer program, which is executable by a processor, comprising: a program code arrangement having program code product for identifying an installation direction of a sensor unit of a vehicle, which is an electronic stability (ESP) unit of the vehicle, by determining a directional orientation of the sensor unit in the vehicle, the sensor unit having at least one acceleration sensor, by performing the following: capturing, via the electronic stability (ESP) unit, a first sensor signal from the acceleration sensor in an acceleration-free state of the vehicle, wherein the acceleration-free state corresponds to a vertical acceleration; capturing, via the electronic stability (ESP) unit, a second sensor signal from the acceleration sensor in response to a linear acceleration of the vehicle; and ascertaining, via a processing unit, the orientation of the sensor unit relative to the vehicle based on the first sensor signal and the second sensor signal; wherein the vehicle has the electronic stability (ESP) unit, wherein the acceleration sensor is a three-axis acceleration sensor which has a predetermined spatial orientation in relation to the ESP unit such that the ascertained orientation of the sensor unit likewise indicates the orientation of the ESP unit, wherein the first sensor signal is used to define a vertical direction based on a gravitational acceleration and an acceleration value corresponding to the second sensor signal to define a longitudinal direction of the vehicle using the direction of the linear acceleration or to determine a potential rotation about the vertical axis, and wherein the sensor unit is arranged in or at the ESP unit such that the orientation of the ESP unit is likewise known, and wherein a rest state is examined before starting the vehicle, so that the linear acceleration of the vehicle along a linear path is used to determine whether the ESP unit is installed correctly.

10. An apparatus for identifying an installation direction of a sensor unit of a vehicle, which is an electronic stability (ESP) unit of the vehicle, by determining a directional orientation of the sensor unit in the vehicle, the sensor unit having at least one acceleration sensor, comprising: the electronic stability (ESP) unit for capturing a first sensor signal from the acceleration sensor in an acceleration-free state of the vehicle and a second sensor signal from the acceleration sensor in response to a linear acceleration of the vehicle, wherein the acceleration-free state corresponds to a vertical acceleration; and a processing unit for ascertaining the orientation of the sensor unit relative to the vehicle based on the first sensor signal and the second sensor signal; wherein the vehicle has the electronic stability (ESP) unit, wherein the acceleration sensor is a three-axis acceleration sensor which has a predetermined spatial orientation in relation to the ESP unit such that the ascertained orientation of the sensor unit likewise indicates the orientation of the ESP unit, wherein the first sensor signal is used to define a vertical direction based on a gravitational acceleration and an acceleration value corresponding to the second sensor signal to define a longitudinal direction of the vehicle using the direction of the linear acceleration or to determine a potential rotation about the vertical axis, and wherein the sensor unit is arranged in or at the ESP unit such that the orientation of the ESP unit is likewise known, and wherein a rest state is examined before starting the vehicle, so that the linear acceleration of the vehicle along a linear path is used to determine whether the ESP unit is installed correctly.

11. A vehicle, comprising: an apparatus for identifying an installation direction of a sensor unit of the vehicle, which is an electronic stability (ESP) unit of the vehicle, by determining a directional orientation of the sensor unit in the vehicle, the sensor unit having at least one acceleration sensor, including: the electronic stability (ESP) unit for capturing a first sensor signal from the acceleration sensor in an acceleration-free state of the vehicle and a second sensor signal from the acceleration sensor in response to a linear acceleration of the vehicle, wherein the acceleration-free state corresponds to a vertical acceleration; and a processing unit for ascertaining the orientation of the sensor unit relative to the vehicle based on the first sensor signal and the second sensor signal; wherein the vehicle has the electronic stability unit (ESP), wherein the acceleration sensor is a three-axis acceleration sensor which has a predetermined spatial orientation in relation to the ESP unit such that the ascertained orientation of the sensor unit likewise indicates the orientation of the ESP unit, wherein the first sensor signal is used to define a vertical direction based on a gravitational acceleration and an acceleration value corresponding to the second sensor signal to define a longitudinal direction of the vehicle using the direction of the linear acceleration or to determine a potential rotation about the vertical axis, and wherein the sensor unit is arranged in or at the ESP unit such that the orientation of the ESP unit is likewise known, and wherein a rest state is examined before starting the vehicle, so that a linear acceleration of the vehicle along the linear path is used to determine whether the ESP unit is installed correctly.

* * * * *